US007417630B2

(12) United States Patent
Kojima et al.

(10) Patent No.: US 7,417,630 B2
(45) Date of Patent: Aug. 26, 2008

(54) DISPLAY CONTROLLER, DISPLAY CONTROL METHOD, AND IMAGE DISPLAY DEVICE

(75) Inventors: Kippei Kojima, Osaka (JP); Hironori Nakatani, Kyoto (JP); Yasuyuki Watanabe, Uji (JP); Akira Sakamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 981 days.

(21) Appl. No.: 10/170,447

(22) Filed: Jun. 14, 2002

(65) Prior Publication Data

US 2003/0043125 A1 Mar. 6, 2003

(30) Foreign Application Priority Data

Aug. 24, 2001 (JP) ............................ 2001-255361

(51) Int. Cl.
*G09G 5/00* (2006.01)
*G06F 12/00* (2006.01)

(52) U.S. Cl. ........................ 345/204; 345/659; 345/564

(58) Field of Classification Search ................. 345/204, 345/649, 659, 689, 531, 564, 565, 566, 76–78, 345/87, 90, 98–100, 213, 572–574
See application file for complete search history.

(56) References Cited

U.S. PATENT DOCUMENTS

| | | | | |
|---|---|---|---|---|
| 5,063,526 | A * | 11/1991 | Kagawa et al. | 345/656 |
| 5,500,654 | A | 3/1996 | Fujimoto | |
| 5,734,875 | A * | 3/1998 | Cheng | 345/568 |
| 5,774,132 | A | 6/1998 | Uchiyama et al. | |
| 5,815,136 | A | 9/1998 | Ikeda et al. | |
| 5,828,418 | A | 10/1998 | Lee | |
| 5,848,201 | A | 12/1998 | Kajiwara | |
| 5,966,116 | A | 10/1999 | Wakeland | |
| 5,999,161 | A | 12/1999 | Kajimoto et al. | |
| 6,016,369 | A | 1/2000 | Koido et al. | |
| 6,157,366 | A | 12/2000 | Sharma | |
| 6,226,016 | B1 | 5/2001 | Chee et al. | |
| 6,479,940 | B1 * | 11/2002 | Ishizuka | 315/169.3 |
| 6,795,062 | B1 * | 9/2004 | Boursier | 345/204 |

FOREIGN PATENT DOCUMENTS

| | | | |
|---|---|---|---|
| CN | 1111464 | A | 11/1995 |
| EP | 0 383 367 | A3 | 8/1990 |
| EP | 0657867 | A1 | 6/1995 |

(Continued)

*Primary Examiner*—Duc Q Dinh
(74) *Attorney, Agent, or Firm*—Birch, Stewart, Kolasch, & Birch, LLP

(57) ABSTRACT

A color data signal (DATA) and the control signal (CTL) are supplied from a central processor to a display controller, and an address conversion parameter included in the control signal (CTL) is stored in a control register 5. In accordance with the address conversion parameter, display address generating means 6 performs address conversion to generate a display address, and in accordance with the display address, the color data signal (DATA) is stored in a primary storage means 7. Thereafter, an image signal is outputted via image signal outputting means 8 to a display panel. This makes it possible to provide the display controller which can reduce a mounting area and power consumption and reduce the load of a processing on the central processor which performs a processing for editing image data.

19 Claims, 13 Drawing Sheets

FOREIGN PATENT DOCUMENTS

| | | | |
|---|---|---|---|
| EP | 0840914 | | 8/1997 |
| GB | 2180378 | A | 3/1987 |
| JP | 07-036772 | | 2/1995 |
| JP | 7-168558 | A | 7/1995 |
| JP | 8-129647 | A | 5/1996 |
| JP | 9-44130 | A | 2/1997 |
| JP | 9-297530 | A | 11/1997 |
| JP | 10-501901 | A | 2/1998 |
| JP | 10-124025 | A | 5/1998 |
| JP | 11-85137 | A | 3/1999 |

* cited by examiner

DISPLAY CONTROLLER, DISPLAY CONTROL METHOD, AND IMAGE DISPLAY DEVICE

FIELD OF THE INVENTION

The present invention relates to a drive control operation of display devices such as a liquid crystal display device and an EL (electroluminescent) display device. More specifically, the invention relates to a display controller which performs an address conversion of image data.

BACKGROUND OF THE INVENTION

Display devices of various electronic apparatuses, which include devices such as a liquid crystal display device, have been sophisticated from year to year. For example, as display performance of the display device, high gradation display has been required. Moreover, contents displayed on the display device have been required to be not only a still picture but also a motion picture. With such a sophisticated display device, information that is necessary for displaying is increasing.

A system for displaying includes devices such as a central processor, a display control device, and a display device. The central processor processes a variety of information, the display control device carries out display control for the display device in accordance with display data supplied from the central processor, and the display device carries out an actual display. In such a system, as information increases along with a sophistication of the display device as described above, load of image processing on the central processor increases.

In this regard, in order to reduce the load on the central processor, there is a growing tendency that a system is built up so that the display control device has a function of image processing, which was originally a function of the central processor. For example, Japanese Unexamined Patent Application No. 2000-89748 (Tokukai 2000-89748, published on Mar. 31, 2000) discloses a display system that a display control device carries out image processing for displaying an image of a portrait mode in a landscape mode. Here, the portrait mode is the mode that a longitudinal length of the image is greater than its lateral length. The landscape mode is the mode that the lateral length of the image is greater than the longitudinal length. This display system is described as follows.

FIG. 13 is a block diagram schematically showing an example of the arrangement of the above display system. As shown in FIG. 13, the display system includes a central processor 51, a liquid crystal controller 52 as a display control device, a display panel 53 as a display device. Further, the liquid crystal controller 52 is provided with an address converting section 54, a primary storage section 55, and a control section 56. Note that, it is assumed in this display system that the display panel is a liquid crystal display panel.

From the central processor 51 to the liquid crystal controller 52, outputted are a color data signal (DATA) of each pixel of with respect to an image to be displayed, a display address data signal (AD) corresponding to an address of each pixel in the display panel 53, and a control signal (CTL) representing rotation information of the image to be displayed. Among these signals, the display address data signal (AD) and the control signal (CTL) are inputted to the address converting section 54. The color data signal (DATA) is inputted to the primary storage section 55.

The display address data signal (AD) is an address signal which has a X-Y dimensional coordinate. Also, the control signal (CTL) is a signal representing, for example, such information that the image of the portrait mode is rotated by 90° to display it in the landscape mode. In accordance with the rotation information indicated by the control signal (CTL), the address converting section 54, to which these signals are inputted, converts a two dimensional address data of each pixel of the display address data signal (AD) on a one-by-one basis. Further, the address converting section 54 sends the converted address data to the primary storage section 55.

In the primary storage section 55, a process is performed for writing the color data signal (DATA) sent from the central processor 51 into the corresponding address in a memory, in accordance with the address data converted in the address converting section 54. Then, in accordance with control operation of the control section 56, data, which is stored in the primary storage section 55, of the address corresponding to each pixel of the display panel 53 is read out and outputted as an image signal (IMG) to the display panel 53. The display panel 53 drives each pixel in the liquid crystal display device in accordance with the inputted image signal (IMG) to perform display of the intended image.

In the display system shown in FIG. 13, the display address data signal (AD) is sent from the central processor 51 to the liquid crystal controller 52. As described above, the display address data signal (AD) is the address signal which has a X-Y dimensional coordinate. For example, when the display panel 53 has 120×160 of resolution, an address signal corresponding to one pixel has data totaling 15 bit, including 7 bit of X-coordinate and 8 bit of Y-coordinate.

Methods for sending such an address signal are considered to be a serial transmission and a parallel transmission. The serial transmission is a method of transmitting the above 15-bit address signal in a sequence over a single line. The parallel transmission is a method of transmitting the 15-bit address signal simultaneously over a plurality of signal lines, for example, fifteen signal lines, allocating one bit of the address signal to one signal line. In case of the serial transmission, the number of signal lines required is only one. However, in some cases of the serial transmission, for example, in case where a large amount of data must be transmitted at a high speed in displaying a motion picture, a clock frequency must be extremely increased. However, it is difficult to realize the increase in the clock frequency. Instead, the parallel transmission is therefore adopted. However, in this case, an address bus with a width of plural bits must be provided between the central processor 51 and the liquid crystal controller 52.

When the address bus with a width of plural bits is provided, both of the central processor 51 and the liquid crystal controller 52 are required to be provided with a plurality of terminals corresponding to the bits. Such a provision of the plurality of terminals causes the increase in the area of a component for the terminals. In case where a display system is applied to the apparatuses that reduction in size is required, such as portable apparatuses, increase in a mounting area is a crucial drawback.

Further, in the address bus which transmits the display address data signal (AD), each time the address signal corresponding to each pixel is transmitted, the electric potential of the signal line is switched at a high speed. Power consumption by parasitic capacitance of signal wiring of which the address bus is composed, which is not negligible, causes increase in power consumption of the whole display system. Especially, in case of application of the display system to portable apparatuses, power consumption is required to be as low as possible.

Also, as described above, the electric potential in the address bus can be switched at a high speed, so that a problem of EMI (Electro Magnetic Interference) arises.

Moreover, in the above display system, the address data corresponding to each pixel is generated by the central processor 51. That is, although an address conversion processing for rotation of the image is carried out by the liquid crystal controller 52, generation of the address data must be carried out by the central processor 51. Therefore, in case where a high speed processing such as display of a motion picture is required, load of processing on the central processor 51 becomes relatively large.

The present invention is accomplished to solve the above problem, and an object of the present invention is to provide a display controller which can reduce a mounting area and power consumption and reduce the load of a processing on the central processor which performs a processing for editing image data, a display control method, and an image display system.

SUMMARY OF THE INVENTION

To achieve the above object, A display controller according to the present invention which outputs an image signal to a display panel in response to image data and an address conversion parameter indicating how to convert an address of each pixel with respect to the image data which are supplied from an external device, includes:

display address generating means for generating a display address of the display panel in accordance with the address conversion parameter; and image signal outputting means for outputting the image data as the image signal in accordance with the display address which is generated by the display address generating means.

In the above arrangement, the image data and the address conversion parameter first are inputted from the external device. Here, the external device is, for example, equivalent of a device which creates and edits images to be displayed and processes a variety of information. The address conversion parameter indicates a method of converting the address of each pixel with respect to the image data, so that the display address generating means can generate the display address in accordance with this address conversion parameter. Therefore, unlike the conventional display controller, it is not necessary to obtain address data which indicate address information of each pixel with respect to the image data from the external device. Accordingly, unlike the conventional display controller, an address bus with a width of plural bits for transmitting an address data signal is not required to be provided between the external device and the display controller. This makes it possible to resolve the problems caused in providing the address bus with a width of plural bits, that is, the problem of increase in mounting area due to increase in terminals, the problem of increase in power consumption by parasitic capacitance of the address bus, and the problem of EMI.

Further, unlike the conventional display controller, it is not necessary to perform address conversion processing in the external device, so that it is possible to reduce the load of processing on the external device. Therefore, even in case where the load on the external device becomes large, for example, by processing the display of a high-resolution motion picture, it is possible to improve the processing ability of the external device by causing the display controller to take the load required for the address conversion processing.

Further, a display control method according to the present invention in a display controller which outputs an image signal to a display panel in response to image data and an address conversion parameter indicating how to convert an address of each pixel with respect to the image data which are supplied from an external device, includes the steps of:

(a) generating a display address of the display panel in accordance with the address conversion parameter; and (b) outputting the image data as the image signal in accordance with the display address which is generated by the display address generating means.

In the above method, the image data and the address conversion parameter first are inputted from the external device. That is, in the above method, the address data signal which indicates address information of each pixel with respect to the image data is not sent from the external device to the display controller. Accordingly, unlike the conventional method, an address bus with a width of plural bits for transmitting an address data signal is not required to be provided between the external device and the display controller. This makes it possible to resolve the problem of increase in mounting area due to increase in terminals, the problem of increase in power consumption by parasitic capacitance of the address bus, and the problem of EMI.

Further, the address conversion processing is performed by the display address generating means. Accordingly, unlike the conventional method, it is not necessary to perform the address conversion processing in the external device, so that it is possible to reduce the load of processing on the external device. This makes it possible to improve the processing ability of a system.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 12, an embodiment of the present invention is described as follows.

Figure 2:
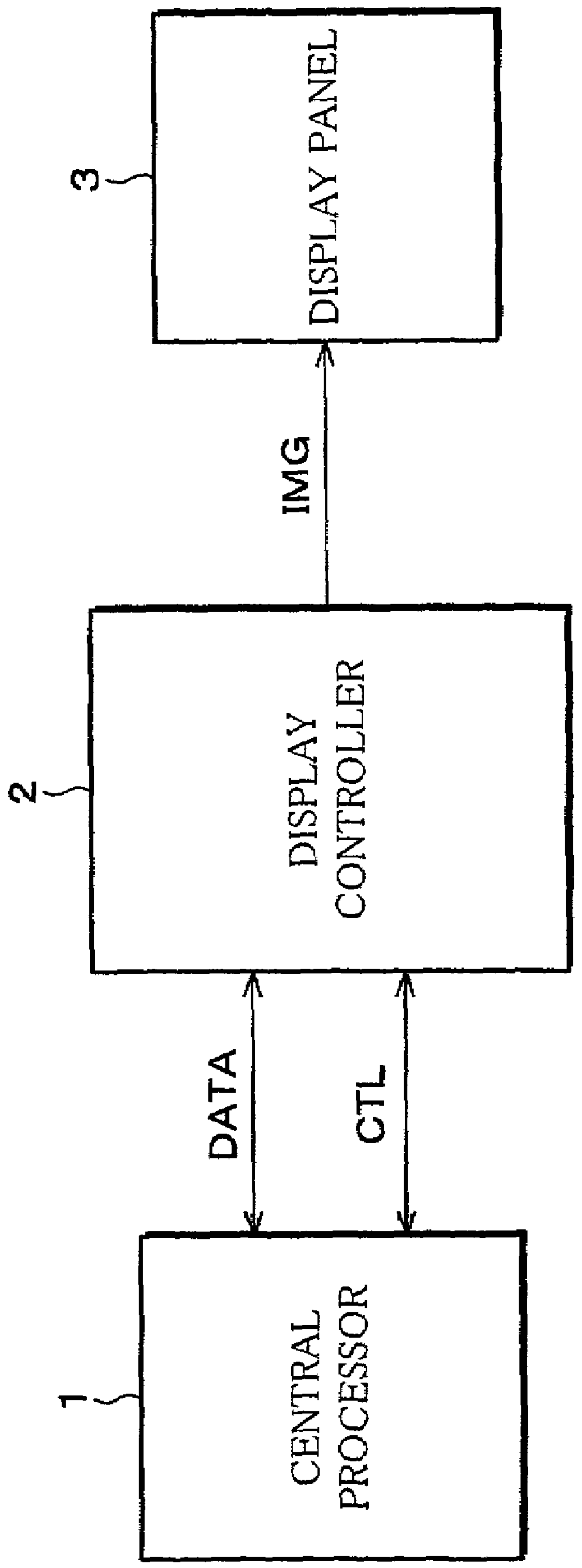
FIG. 2 is a block diagram schematically showing an arrangement of an image display system according to the present embodiment.

FIG. 2 is a block diagram schematically showing an arrangement of an image display system according to the present embodiment. As shown in FIG. 2, the image display system includes a central processor 1, a display controller 2, and a display panel 3.

The central processor 1 is a block which creates and edits images to be displayed and processes a variety of information of the whole image display system. The central processor 1 is composed of, for example, a CPU (Central Processing Unit) as calculating means, a RAM (Random Access Memory) as a working area, and an EEPROM (Electrically Erasable/Programmable Read Only Memory) as a nonvolatile memory. For example, a program, read out on the RAM from the EEPROM, is executed by the central processor 1 to carry out various image processing and information processing. In case where the central processor 1 is connected to communicating means, it may be possible to download the above program via a communication network so as to read out the program on the RAM. Note that, the above nonvolatile memory is not limited to the EEPROM, and, for example, any type of nonvolatile memory such as FeRAM and MRAM may be adopted.

The central processor 1 generates a color data signal (DATA) and a control signal (CTL), which are data for displaying. The color data signal (DATA) is a signal that represents a luminance value in color components, Red, Green, and Blue, of each pixel with respect to an image to be displayed. The control signal (CTL) is a signal that includes rotation information of an image, start address information, and longitudinal and lateral pixel number information of an image. The rotation information of an image is such information that in case where an original image is in a landscape mode, and a display screen in the display panel 3 has a portrait mode, the original image is rotated, for example, by 90° to be displayed. The start address information is information that indicates what address starts first for displaying in the display screen of the display panel 3. The longitudinal and lateral pixel number information is information that indicates the number of pixels in a longitudinal direction and a lateral direction of the image to be displayed. Such a color data signal (DATA) and a control signal (CTL) are sent from the central processor 1 to the display controller 2.

The display controller 2 first recognizes the rotation information of the image, the start address information, the longitudinal and lateral pixel number information of the image in accordance with the inputted control signal (CTL). Then, a display address of each pixel is calculated based on these information, and the color data signal (DATA) supplied from the central processor 1 is corresponded to the calculated display address to be stored. Thereafter, an image data stored corresponding to the display address is outputted as an image signal (IMG) toward the display panel 3.

The display panel 3, a block that actually displays an image in accordance with the inputted image signal (IMG), is assumed to be a liquid crystal display device in the present embodiment. Note that, the display panel 3 is not limited to the liquid crystal display device, and various display panels, for example, an organic EL (electroluminescent) panel may be adopted.

Figure 1:
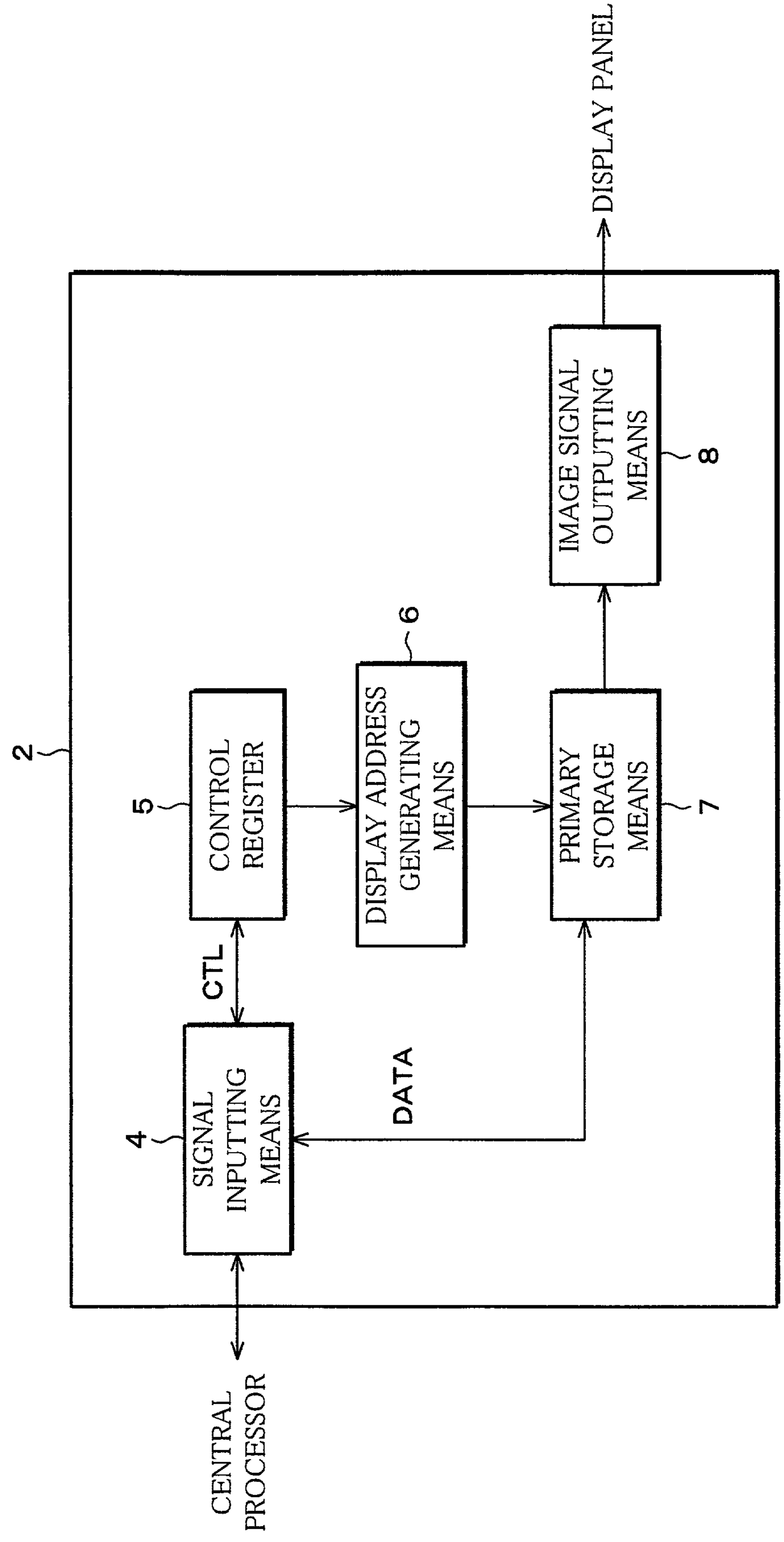
FIG. 1 is a block diagram schematically showing an arrangement of the display controller according to an embodiment of the present invention.

FIG. 1 is a block diagram schematically showing an arrangement of the display controller 2. As shown in FIG. 1, the display controller 2 is provided with a signal inputting means 4, a control register 5, a display address generating means 6, a primary storage means 7, and an image signal outputting means 8.

The signal inputting means 4 is a block to which the color data signal (DATA) and the control signal (CTL) sent from the central processor 1 are inputted. The signal inputting means 4 discriminates types of inputted signals and outputs the control signal (CTL) and the color data signal (DATA) to the control register 5 and the primary storage means 7, respectively.

Figure 3:
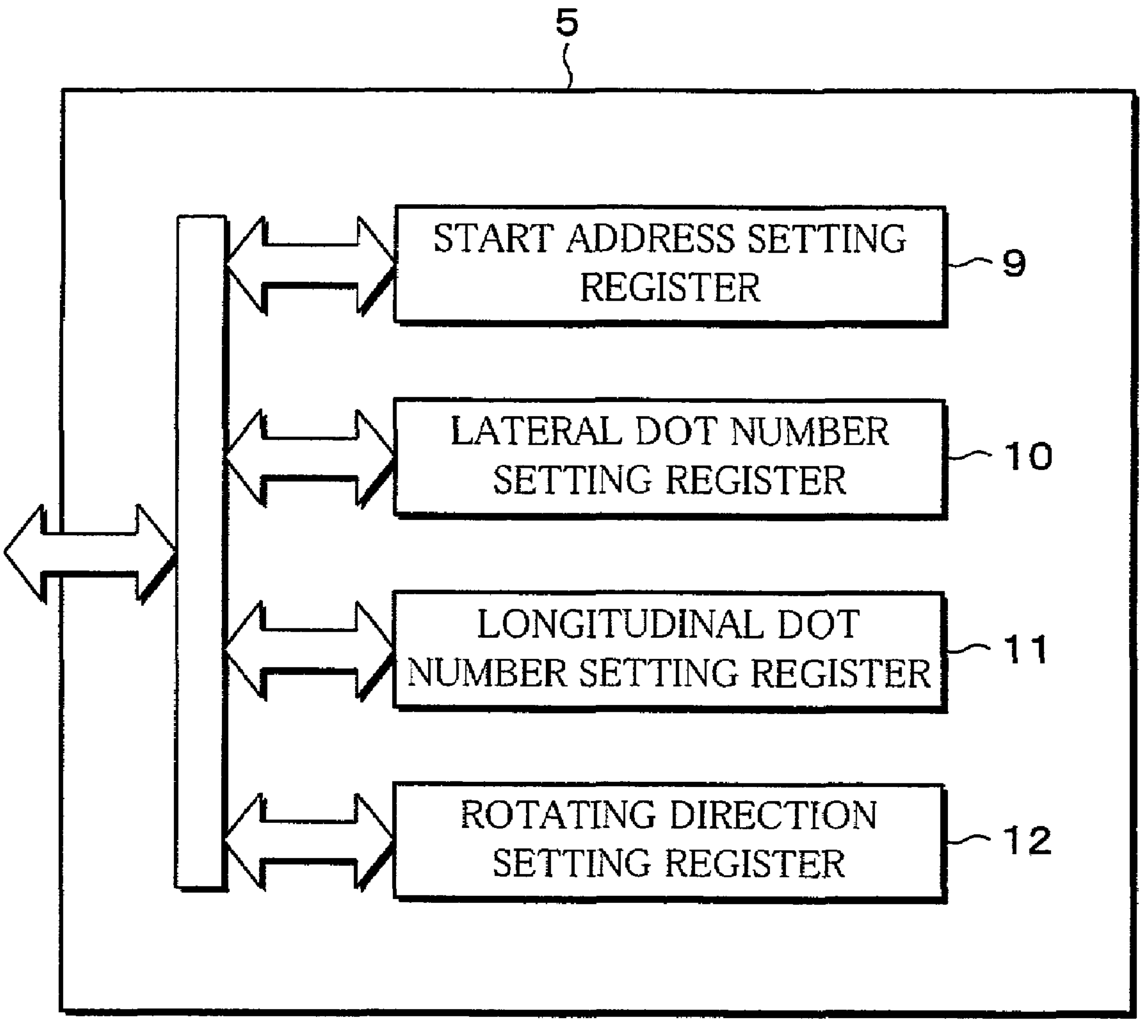
FIG. 3 is a block diagram schematically showing an arrangement of a control register provided in the display controller.

The control register 5 is a block which stores information included in the control signal (CTL) sent from the signal inputting means 4. FIG. 3 is a block diagram schematically showing an arrangement of the control register 5. As shown in FIG. 3, the control register 5 is provided with a start address setting register 9, a lateral dot number setting register 10, a longitudinal dot number setting register 11, and a rotating direction setting register 12.

The start address setting register 9 is a register that stores start address information included in the control signal (CTL). The lateral dot number setting register 10 and the longitudinal dot number setting register 11 are registers which store the number of dot in the lateral direction of image and the number of dot in the longitudinal direction, respectively, in accordance with the longitudinal and lateral pixel number information included in the control signal (CTL). The rotating direction setting register 12 is a register that stores the rotation information of the image included in the control signal (CTL).

The display address generating means 6 is a block that generates the actual display address for the display panel 3 in accordance with the start address information, the lateral and longitudinal dot number information, and the rotation information, which are stored in the control register 5. A processing in the display address generating means 6 will be described in detail later.

The primary storage means 7 is a memory that stores the color data signal (DATA) sent from the signal inputting means 4 in accordance with the display address generated by the display address generating means 6. The primary storage means 7 has a memory address space which is set so as to correspond to the display address for the display panel 3. Meanwhile, data of each pixel with respect to the color data signal (DATA) are stored as image data in the appropriate memory address in accordance with the corresponding display address.

The image signal outputting means 8 is a block that reads out the image data stored in the primary storage means 7 in order of display addresses for the display panel 3 to output the image data as the image signal (IMG) to the display panel 3.

Note that, the color data signal (DATA) and the control signal (CTL) are basically transmitted from the central processor 1 to the display controller 2. However, these color data signal (DATA) and control signal (CTL) may be possible to be transmitted from the display controller 2 to the central processor 1. Such a transmission to the central processor 1 is carried out, for example, when the central processor 1 needs the image data stored in the display controller 2. More specifically, in response to a request for transmitting the image data to the display controller 2 by the central processor 1, the color data signal (DATA) and the control signal (CTL) are transmitted via the signal inputting means 4 from the primary storage means 7 and the control register 5, respectively, to the central processor 1. The central processor 1 restores the image data in accordance with the received color data signal (DATA) and the control signal (CTL).

The following will describe a flow of a processing in the above arranged display controller 2. First, when a signal is inputted from the central processor 1 to the display controller 2, the signal inputting means 4 discriminates whether the inputted signal is the control signal (CTL) or the color data signal (DATA). When the inputted signal is discriminated to be the control signal (CTL), its data is stored in the control register 5.

Then, the display address generating means 6 recognizes an address rotating direction in accordance with the rotation information stored in the rotating direction setting register 12 of the control register 5, and selects an algorithm for realizing an address conversion by the address rotating direction. Here, it is assumed that the address rotating direction is, for example, 0°, 90°, 180°, and 270°. It is defined that the display address generating means 6 stores the address conversion algorithm corresponding to each rotating angle in the storing means not shown.

Then, the display address generating means 6 reads out the start address information, the lateral dot number information, the longitudinal dot number information which are stored in the start address setting register 9, the lateral dot number setting register 10, and the longitudinal dot number setting register 11, respectively, of the control register 5. Further, the display address generating means 6 calculates the display address in accordance with the selected address conversion algorithm to output it to the primary storage means 7.

The primary storage means 7 makes the appropriate address in its memory store the data of each pixel with respect to the color data signal (DATA) inputted from the signal inputting means 4 as the image data, corresponding to the display address inputted from the display address generating means 6. Then, the image data stored in the primary storage means 7 is outputted as the image signal (IMG) via the image signal outputting means 8 to the display panel 3.

Figure 4:
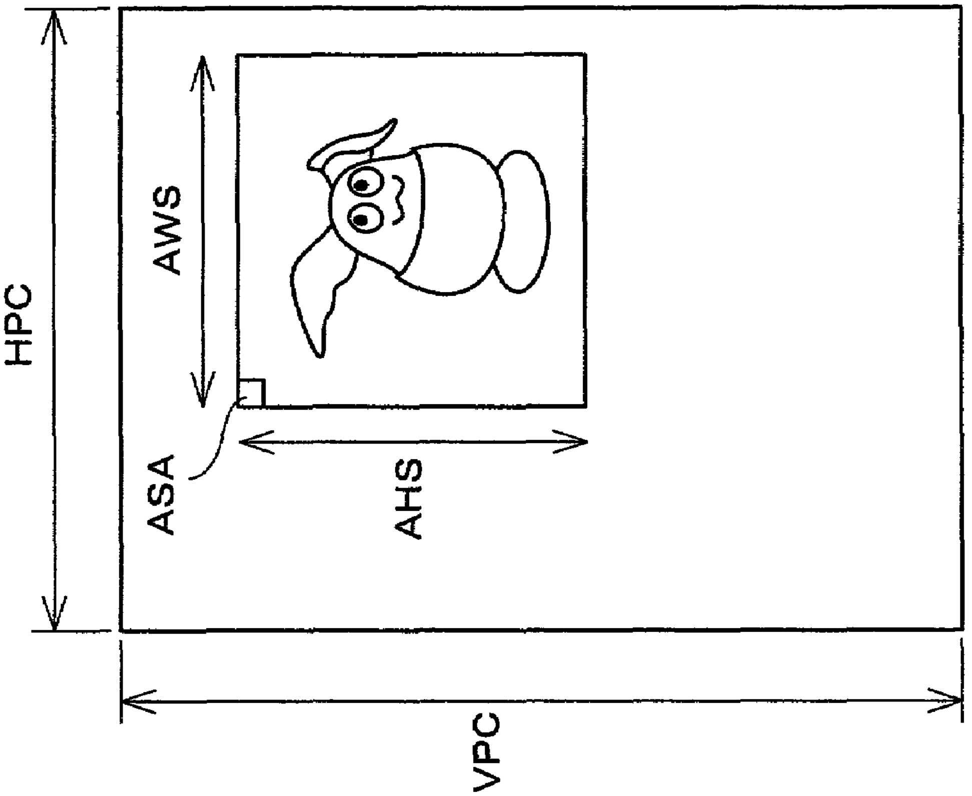
FIG. 4(*a*) is a drawing illustrating an example of an image data produced in the central processor, and FIG. 4(*b*) is an explanatory view showing the state that the image data shown in FIG. 4(*a*) is displayed on a display screen of a display panel.
Figure 4:
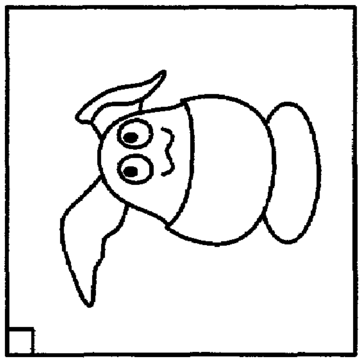

Next, referring to FIGS. 4(*a*) and 4(*b*), the transfer of the image data is schematically described. FIG. 4(*a*) shows an example of the image data produced in the central processor 1. FIG. 4(*b*) shows the state that the image data shown in FIG. 4(*a*) is displayed on the display screen of the display panel 3. Thus, in the image display system of the present embodiment, it is possible to display the image generated in the central processor 1 at any locations in the display screen of the display panel 3.

Here, the lateral dot number and the longitudinal dot number in the display screen of the display panel 3 are referred to as HPC and VPC, respectively. The lateral dot number and the longitudinal dot number in the image created in the central processor 1 are referred to as AWS and AHS, respectively. The display start position of the image created in the central processor 1 on the display screen, that is, a start address is referred to as ASA. In this regard, it is found that the start address (ASA), the lateral dot number (AWS) of the image data, and the longitudinal dot number (AHS) should be specified to display the image data shown in FIG. 4(*a*) at a desired location on the display panel. Note that, ASA is data stored in the start address setting register 9 of the control register 5. AWS and AHS are data stored in the lateral dot number setting register 10 and the longitudinal dot number setting register 11, respectively.

Next, the following will describe a processing of address conversion in the display address generating means 6. First, the outline of the address conversion accompanied by rotation is described with a simple example. Here, it is assumed that there are four types of rotation: 0°, 90°, 180°, and 270°, as described above. In this case, the rotating direction setting register 12 of the control register 5 is composed of a two-bit register. The rotation type is indicated by two-bit data represented as VWR [1:0]. As an example, the case where VWR1 and VWR0 are 0, the case where VWR1 is 0 and VWR0 is 1, the case VWR1 is 1 and VWR0 is 0, and the case where VWR1 is 1 and VWR0 is 1 indicate the rotations of 0°, 90° 180°, and 270°, respectively.

Figure 5:
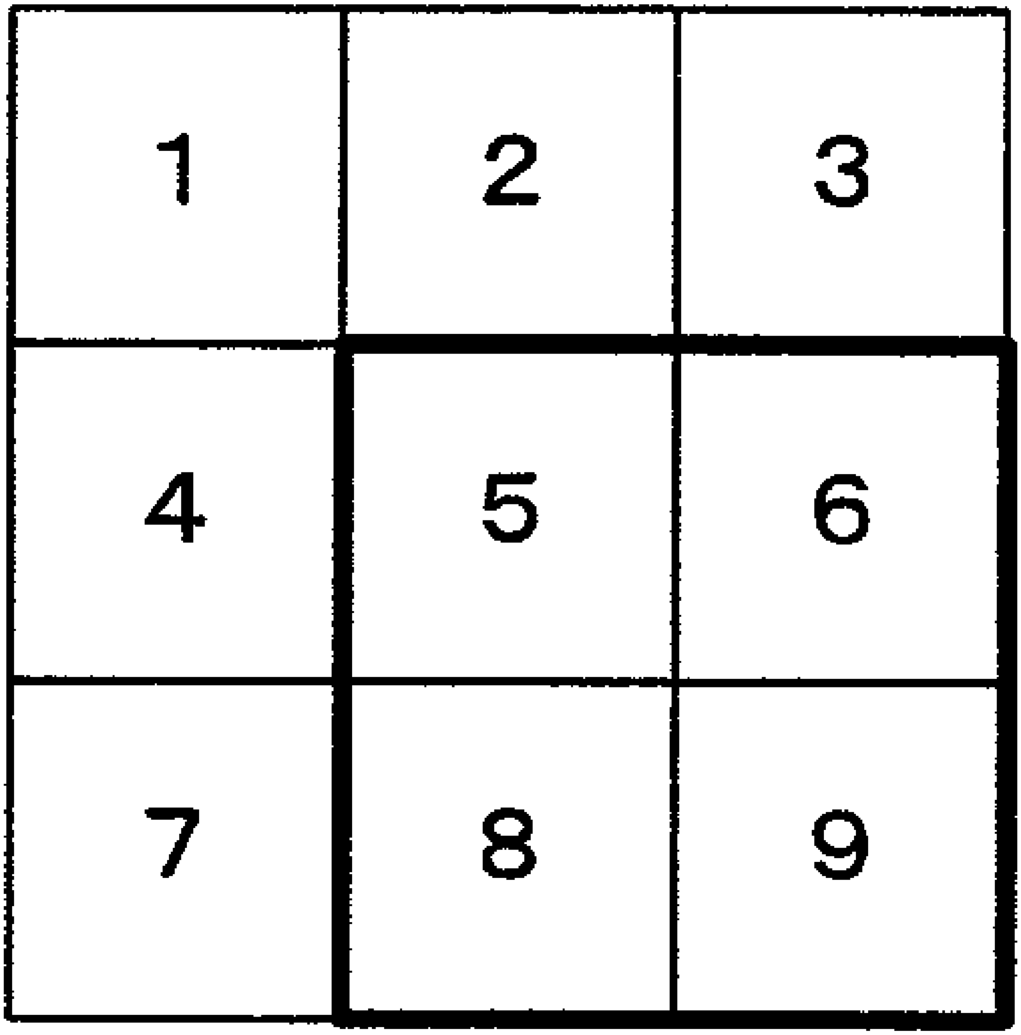
FIG. 5 is an explanatory view showing a 3×3 pixel matrix whose pixels have numbers 1 through 9, respectively.

Here, as shown in FIG. 5, assumed is a 3×3 pixel matrix whose pixels have numbers 1 through 9, respectively. When the address conversion for rotation is performed in the range of a 2×2 pixel matrix, where a centered pixel 5 in the pixel matrix is an original point address, the order of addresses in each rotating angle is shown in the following Table 1.

TABLE 1

| VWR1 | VWR0 | Order of addresses |
|---|---|---|
| 0 | 0 | 5→6→8→9 |
| 0 | 1 | 5→8→4→7 |
| 1 | 0 | 5→4→2→1 |
| 1 | 1 | 5→2→6→3 |

Figure 6:
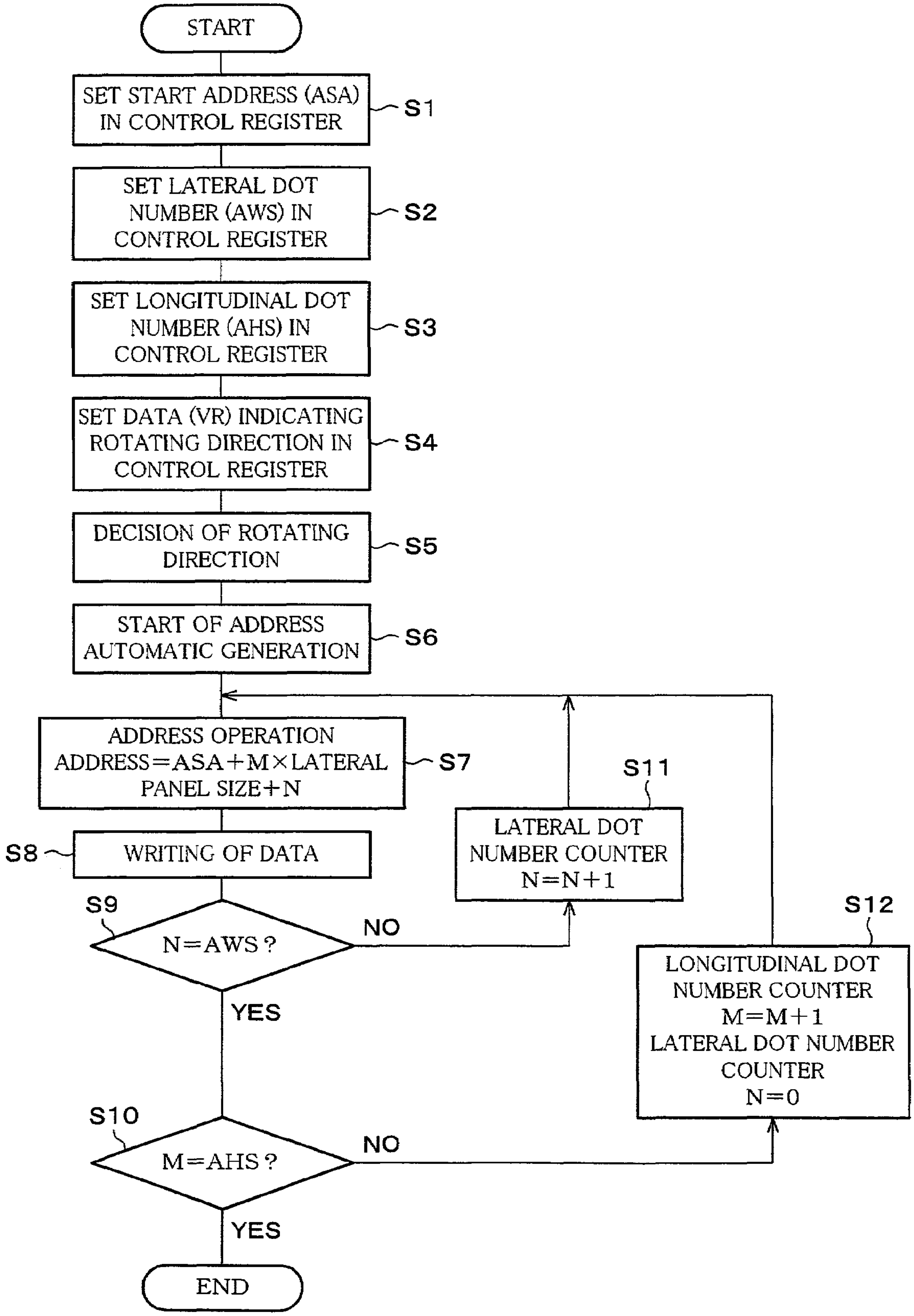
FIG. 6 is a flow chart showing a flow of processing in case of the address conversion of 0° rotation.

Next, referring to a flow chart shown in FIG. 6, the following will describe a flow of a processing in case of the address conversion of 0° rotation. First, the control signal (CTL) is supplied from the central processor 1 to the display controller 2. The control signal (CTL) is inputted to the control register 5 via the signal inputting means 4. Then, the start address (ASA) included in the control signal (CTL) is set in the start address setting register 9 of the control register 5 (Step 1) (Step 1 is referred to as "S1", and hereafter Steps are similarly referred to).

Also, the lateral dot number (AWS) included in the control signal (CTL) is set in lateral dot number setting register 10 of the control register 5 (S2), and the longitudinal dot number (AHS) is set in the longitudinal dot number setting register 11 (S3). Furthermore, data (VR), which indicates rotating direction, included in the control signal (CTL) is set in the rotating direction setting register 12 of the control register 5.

After referring the rotation information set in the rotating direction setting register 12 and checking that it indicates the rotation of 0°, the display address generating means 6 selects an algorithm for realizing the rotation of 0° (S5) and starts an automatic generation of the address, that is, the processing of address conversion (S6).

Here, the address of each pixel with respect to the original image has a lateral address N ($0 \leqq N \leqq AWS$) and a longitudinal address M ($0 \leqq M \leqq AHS$), and an initial value is N=M=0. Then, an address (TAD) after conversion is calculated by the equation: $TAD = ASA + M \times HPC + N$ . . . (1) (S7).

Note that, the address (TAD) after conversion is one-dimensional representation of the address of each pixel on the display screen with respect to the display panel 3. That is, for example, in case where the display screen of the display panel 3 has a 120-pixel wide by 160-pixel high matrix, addresses on the topmost lateral line are 1 through 120, addresses on the second lateral line from the top are 121 through 240, and addresses on the lowest lateral line are 19080 through 19200.

When the address (TAD) after conversion is calculated by the above equation (1), data of pixels corresponding to the color data signal (DATA) is written in the appropriate address of the primary storage means 7 (S8). Then, it is determined in S9 whether it is N=AWS. When it is No, 1 is added to a value of N (S11), and the process of S7 is performed again.

On the other hand, when it is determined in S9 that it is N=AWS (YES in S9), it is determined in S10 whether it is M=AHS. When it is determined that it is not M=AHS (NO in S10), 1 is added to a value of M as well as the value of N is reset to zero (S12), and the process of S7 is performed again. On the other hand, when it is determined in S10 that it is M=AHS (YES in S10), it means that all addresses are converted, and the processing of address conversion is finished.

Figure 7:
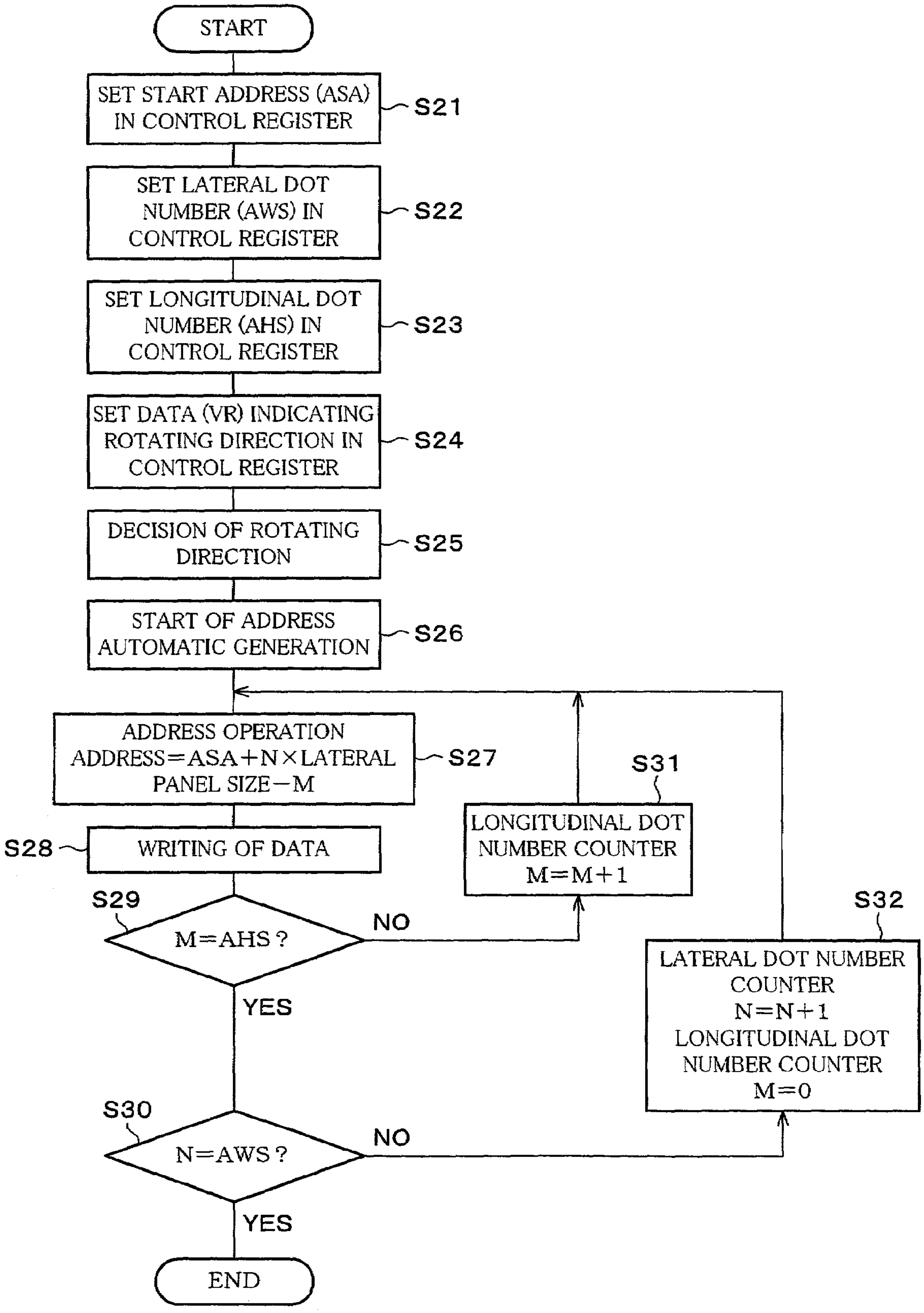
FIG. 7 is a flow chart showing a flow of processing in case of the address conversion of 90° rotation.

Next, referring to a flow chart shown in FIG. 7, the following will describe a flow of a processing in case of address conversion of 90° rotation. The process of S21 through S24 is the same as that of S1 through S4 in the flow chart shown in FIG. 6; therefore, the explanation thereof is omitted here.

After referring the rotation information set in the rotating direction setting register 12 and checking that it indicates the rotation of 90°, the display address generating means 6 selects an algorithm for realizing the rotation of 90° (S25) and starts an automatic generation of the address, that is, the processing of address conversion (S26).

Here, as in the case of 0° rotation, the address of each pixel with respect to the original image has a lateral address N (0≦N≦AWS) and a longitudinal address M (0≦M≦AHS), and an initial value is N=M=0. Then, an address (TAD) after conversion is calculated by the equation: TAD=ASA+N×HPC−M . . . (2) (S27).

When the address (TAD) after conversion is calculated by the above equation (2), data of pixels corresponding to the color data signal (DATA) is written in the appropriate address of the primary storage means 7 (S28). Then, it is determined in S29 whether it is M=AHS. When it is No, 1 is added to a value of M (S31), and the process of S27 is performed again.

On the other hand, when it is determined in S29 that it is M=AHS (YES in S29), it is determined in S30 whether it is N=AWS. When it is determined that it is not N=AWS (NO in S30), 1 is added to a value of N as well as the value of M is reset to zero (S32), and the process of S27 is performed again. On the other hand, when it is determined in S30 that it is N=AWS (YES in S30), it means that all addresses are converted, and the processing of address conversion is finished.

Figure 8:
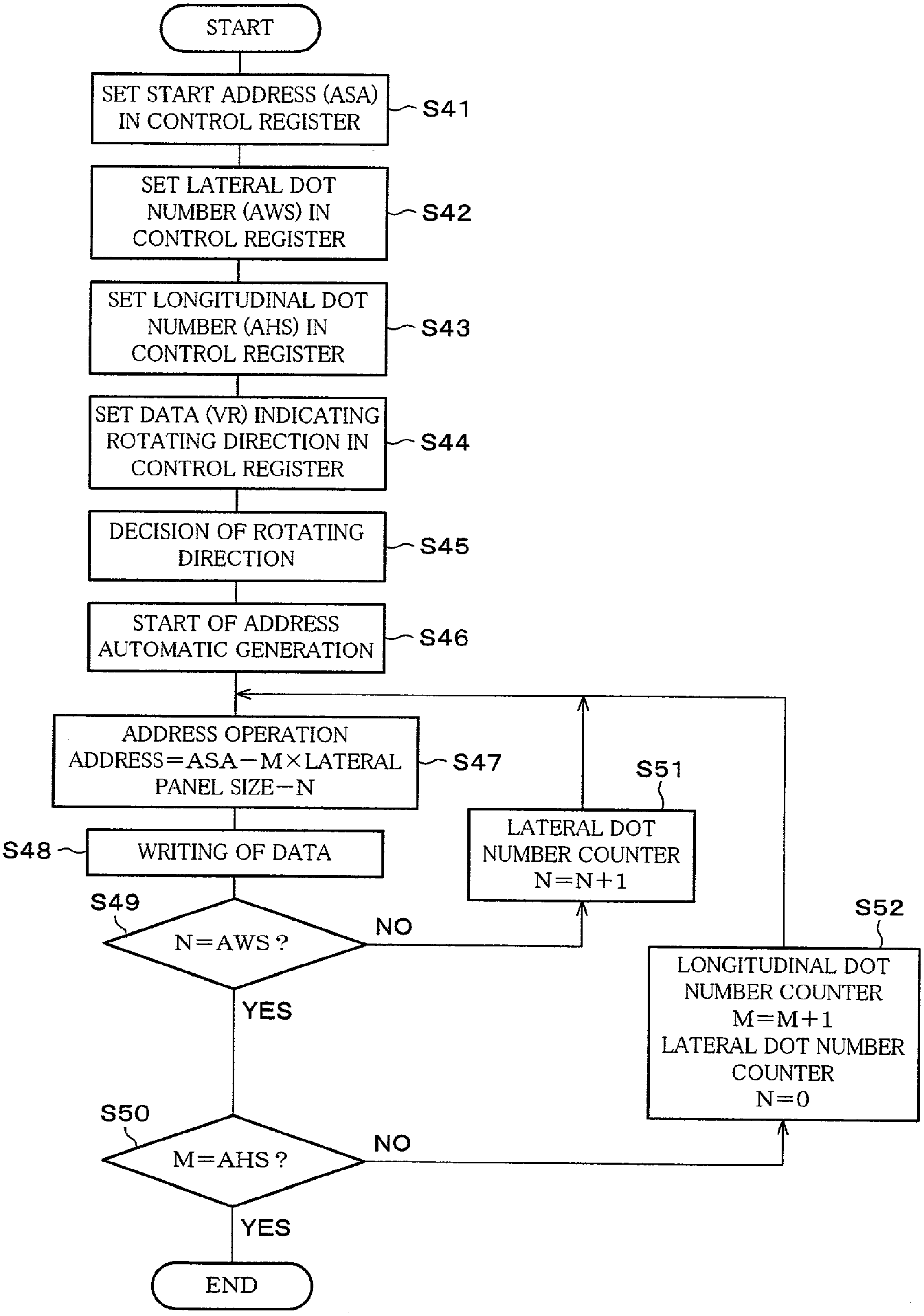
FIG. 8 is a flow chart showing a flow of processing in case of the address conversion of 180° rotation.

Next, referring to a flow chart shown in FIG. 8, the following will describe a flow of processing in case of address conversion of 180° rotation. The process of S41 through S44 is the same as that of S1 through S4 in the flow chart shown in FIG. 6; therefore, the explanation thereof is omitted here.

After referring the rotation information set in the rotating direction setting register 12 and checking that it indicates the rotation of 180°, the display address generating means 6 selects an algorithm for realizing the rotation of 180° (S45) and starts an automatic generation of the address, that is, the processing of address conversion (S46).

Here, as in the case of 0° rotation, the address of each pixel with respect to the original image has a lateral address N (0≦N≦AWS) and a longitudinal address M (0≦M≦AHS), and an initial value is N=M=0. Then, an address (TAD) after conversion is calculated by the equation: TAD=ASA−M×HPC−N . . . (3) (S47).

When the address (TAD) after conversion is calculated by the above equation (3), data of pixels corresponding to the color data signal (DATA) is written in the appropriate address of the primary storage means 7 (S48). Then, it is determined in S49 whether it is N=AWS. When it is No, 1 is added to a value of N (S51), and the process of S47 is performed again.

On the other hand, when it is determined in S49 that it is N=AWS (YES in S49), it is determined in S50 whether it is M=AHS. When it is determined that it is not M=AHS (NO in S50), 1 is added to a value of M as well as the value of N is reset to zero (S52), and the process of S47 is performed again. On the other hand, when it is determined in S50 that it is M=AHS (YES in S50), it means that all addresses are converted, and the processing of address conversion is finished.

Figure 9:
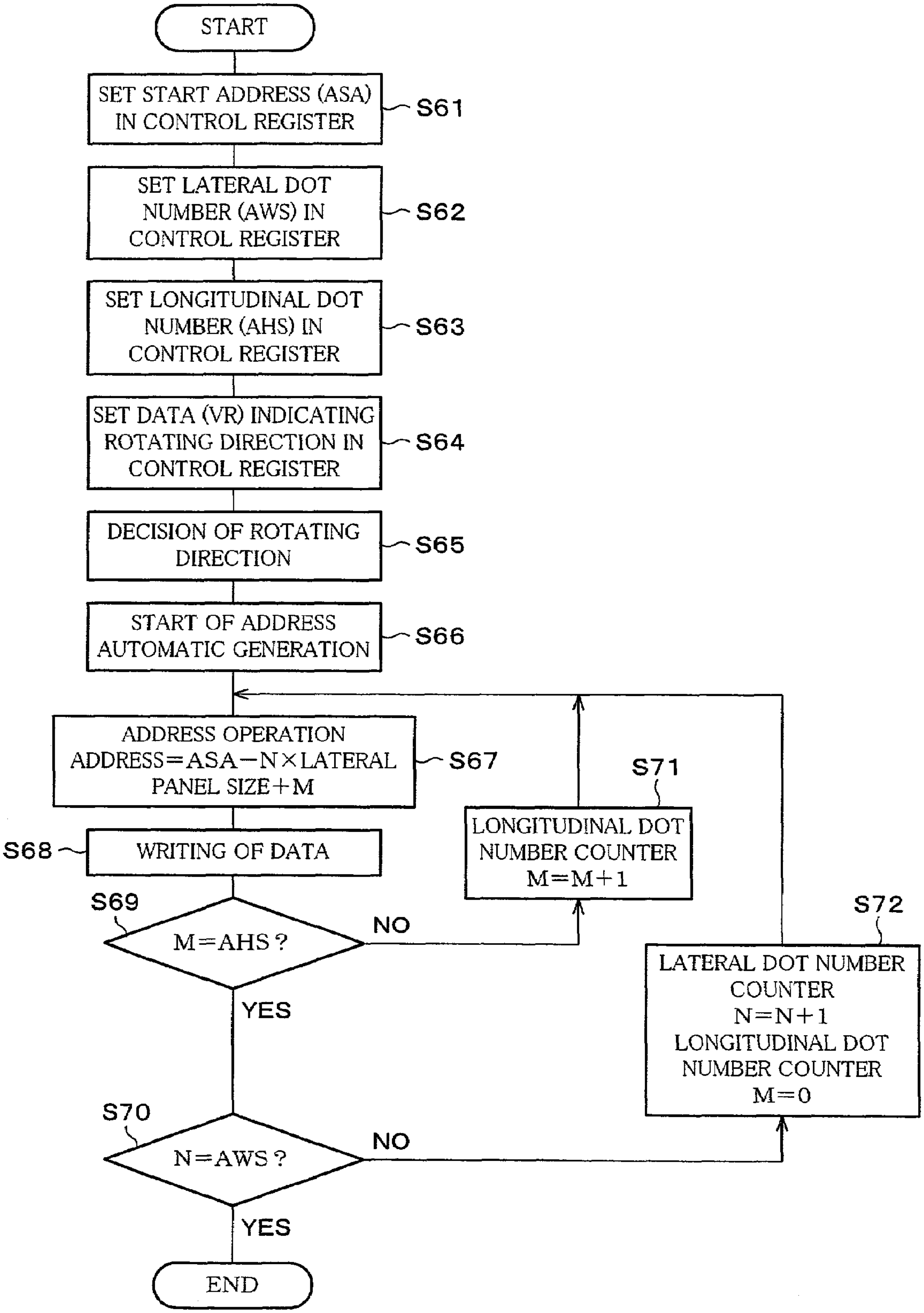
FIG. 9 is a flow chart showing a flow of processing in case of the address conversion of 270° rotation.

Next, referring to a flow chart shown in FIG. 9, the following will describe a flow of a processing in case of address conversion of 270° rotation. The process of S61 through S64 is the same as that of S1 through S4 in the flow chart shown in FIG. 6; therefore, the explanation thereof is omitted here.

After referring the rotation information set in the rotating direction setting register 12 and checking that it indicates the rotation of 270°, the display address generating means 6 selects an algorithm for realizing the rotation of 270° (S65) and starts an automatic generation of the address, that is, the processing of address conversion (S66).

Here, as in the case of 0° rotation, the address of each pixel with respect to the original image has a lateral address N (0≦N≦AWS) and a longitudinal address M (0≦M≦AHS), and an initial value is N=M=0. Then, an address (TAD) after conversion is calculated by the equation: TAD=ASA−N×HPC+M . . . (4) (S67).

When the address (TAD) after conversion is calculated by the above equation (4), data of pixels corresponding to the color data signal (DATA) is written in the appropriate address of the primary storage means 7 (S68). Then, it is determined in S69 whether it is M=AHS. When it is No, 1 is added to a value of M (S71), and the process of S67 is performed again.

On the other hand, when it is determined in S69 that it is M=AHS (YES in S69), it is determined in S70 whether it is N=AWS. When it is determined that it is not N=AWS (NO in S70), 1 is added to a value of N as well as the value of M is reset to zero (S72), and the process of S67 is performed again. On the other hand, when it is determined in S70 that it is N=AWS (YES in S70), it means that all addresses are converted, and the processing of address conversion is finished.

Figure 10:
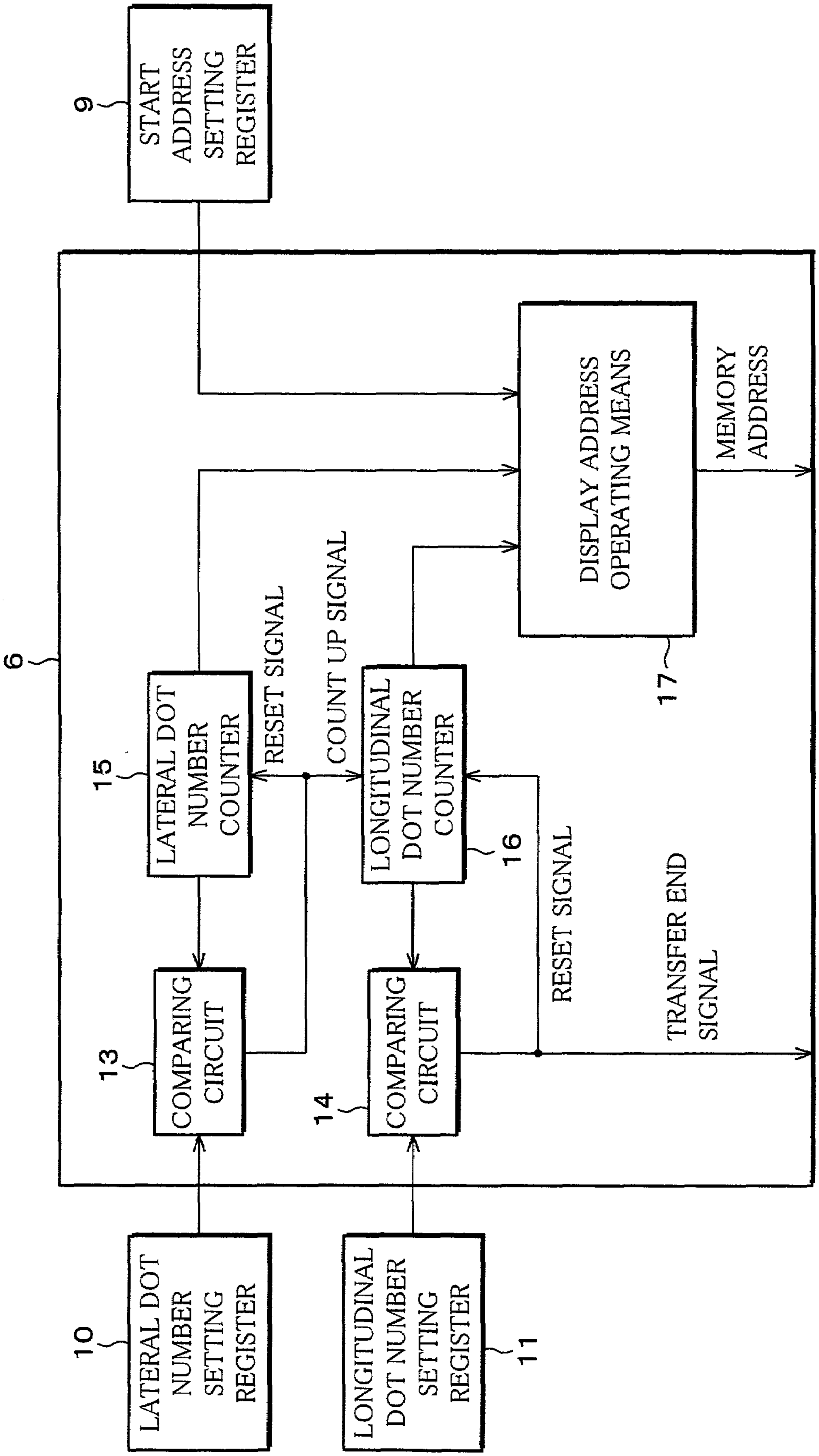
FIG. 10 is a block diagram showing an example of an arrangement of the display address generating means which performs address conversion processing of 0° rotation, 180° rotation, and left/right reverse.

Next, the following will describe a specific example of an arrangement of the display address generating means 6 for realization of the above processing of address conversion. FIG. 10 is a block diagram showing an example of an arrangement of the display address generating means 6 which performs the above address conversion processing of 0° rotation. As described in FIG. 10, the display address generating means 6 is provided with comparing circuits 13 and 14, a lateral dot number counter 15, a longitudinal dot number counter 16, and a display address operating means 17.

The lateral dot number counter 15 is a counter that counts the above lateral address N. The longitudinal dot number counter 16 is a counter that counts the above longitudinal address M. The comparing circuit 13 is a circuit for comparing between a value (AWS) set in the lateral dot number setting register 10 inside the control register 5 and a value (N) counted by the lateral dot number counter 15. The comparing circuit 14 is a circuit for comparing between a value (AHS) set in the longitudinal dot number setting register 11 inside the control register 5 and a value (M) counted by the longitudinal dot number counter 16. The display address operating means 17 is a block that performs the operation of the above equation (1) in accordance with the value (N) counted by the lateral dot number counter 15, the value (M) counted by the longitudinal dot number counter 16, the start address (ASA) set in the start address setting register 9.

The following will describe the processing of the display address generating means 6 having such an arrangement. First, as an initial condition, set to zero are values of the number of count (N) in the lateral dot number counter 15 and the number of count (M) in the longitudinal dot number counter 16.

Then, the count up is performed by the lateral dot number counter 15. Each time the count up is performed, a converting operation of the appropriate address is performed in the display address operating means 17. The converted address is outputted as a memory address to the primary storage means 7. During the count up by the lateral dot number counter 15, the comparing circuit 13 compares between the value (N) counted by the lateral dot number counter 15 and the value (AWS) set in the lateral dot number setting register 10.

Then, in the comparing circuit 13, when agreement between the count value (N) and the setting value (AWS) is determined, a reset signal is sent from the comparing circuit 13 to the lateral dot number counter 15, and the count value (N) in the lateral dot number counter 15 is reset to zero. At the same time, a count up signal is sent from the comparing circuit 13 to the longitudinal dot number counter 16, and the count value (M) in the longitudinal dot number counter 16 is counted up.

In this manner, during the count up in the longitudinal dot number counter 16, the comparing circuit 14 compares between the value (M) counted in the longitudinal dot number counter 16 and the value (AHS) set in the longitudinal dot number setting register 11.

Then, in the comparing circuit 14, when agreement between the count value (M) and the setting value (AHS) is determined, a reset signal is sent from the comparing circuit 14 to the longitudinal dot number counter 16, and the count value (M) in the longitudinal dot number counter 16 is reset to zero. At the same time, a transfer end signal is sent from the comparing circuit 14 to the primary storage means 7. The primary storage means 7 receives the transfer end signal and detects that the transfer of a screenful of image data is finished.

Note that, as is apparent from the comparison between the flow charts in FIG. 6 and FIG. 8, only the equation of address conversion is different between the address conversion processing of 0° rotation and the address conversion processing of 180° rotation. Therefore, the arrangement of the display address generating means 6 which performs the address conversion processing of 180° rotation can be realized with the similar arrangement shown in FIG. 10.

Figure 11:
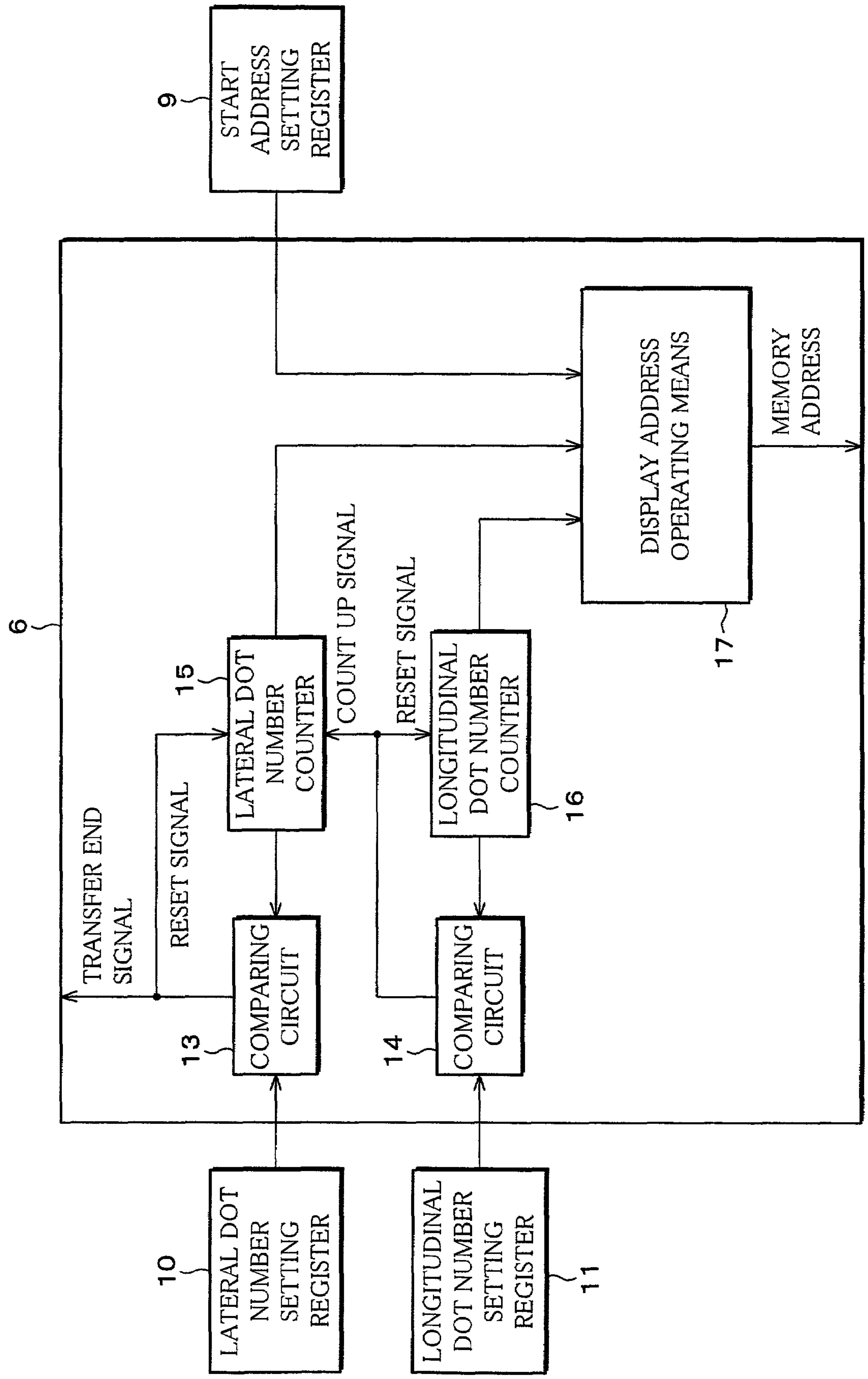
FIG. 11 is a block diagram showing an example of an arrangement of the display address generating means which performs address conversion processing of 90° rotation and 270° rotation.

Also, FIG. 11 is a block diagram showing an example of an arrangement of the display address generating means 6 which performs the above address conversion processing of 90° rotation. As compared with the arrangement shown in FIG. 10, the arrangement shown in FIG. 11, is the same in members, but is different in a flow of signals and a flow of processing. The following will describe a flow of processing in the display address generating means 6 having the arrangement shown in FIG. 11.

First, as an initial condition, set to zero are values of the number of count (N) in the lateral dot number counter 15 and the number of count (M) in the longitudinal dot number counter 16.

Then, the count up is performed by the longitudinal dot number counter 16. Each time the count up is performed, a converting operation of the appropriate address is performed in the display address operating means 17. The converted address is outputted as a memory address to the primary storage means 7. During the count up by the longitudinal dot number counter 16, the comparing circuit 14 compares between the value (M) counted by the longitudinal dot number counter 16 and the value (AHS) set in the longitudinal dot number setting register 11.

Then, in the comparing circuit 14, when agreement between the count value (M) and the setting value (AHS) is determined, a reset signal is sent from the comparing circuit 14 to the longitudinal dot number counter 16, and the count value (M) in the longitudinal dot number counter 16 is reset to zero. At the same time, a count up signal is sent from the comparing circuit 14 to the lateral dot number counter 15, and the count value (N) in the lateral dot number counter 15 is counted up.

In this manner, during the count up in the lateral dot number counter 15, the comparing circuit 13 compares between the value (N) counted in the lateral dot number counter 15 and the value (AWS) set in the lateral dot number setting register 10.

Then, in the comparing circuit 13, when agreement between the count value (N) and the setting value (AWS) is determined, a reset signal is sent from the comparing circuit 13 to the lateral dot number counter 15, and the count value (N) in the lateral dot number counter 15 is reset to zero. At the same time, a transfer end signal is sent from the comparing circuit 13 to the primary storage means 7. The primary storage means 7 receives the transfer end signal and detects that the transfer of a screenful of image data is finished.

Note that, as is apparent from the comparison between the flow charts in FIG. 7 and FIG. 9, only the equation of address conversion is different between the address conversion processing of 90° rotation and the address conversion processing of 270° rotation. Therefore, the arrangement of the display address generating means 6 which performs the address conversion processing of 270° rotation can be realized with the similar arrangement shown in FIG. 11.

In the above arrangements, the address after conversion which is sent from the display address generating means 6 to the primary storage means 7 is one-dimensional representation. That is, the above equations (1) through (4) are operations for calculating addresses of one-dimensional representation. However, the present invention is not limited to this, it may be arranged so that address of two-dimensional representation is calculated in the display address generating means 6, and the resulted address is sent to the primary storage means 7. The following will describe operations for addresses of two-dimensional representation.

Here, with respect to the start address (ASA), a coordinate value of X component is SX, and a coordinate value of Y component is SY. The X component and Y component of the address after conversion is TX and TY, respectively. First, an address conversion computing equation in case of 0° rotation is:

$$TX=SX+N,\ TY=SY+M \tag{5}$$

An address conversion computing equation in case of 90° rotation is:

$$TX=SX-N,\ TY=SY+M \tag{6}$$

An address conversion computing equation in case of 180° rotation is:

$$TX=SX-N,\ TY=SY-M \tag{7}$$

An address conversion computing equation in case of 270° rotation is:

$$TX=SX+N,\ TY=SY-M \tag{8}$$

As described above, the address after conversion which is sent from the display address generating means 6 to the primary storage means 7 may be one-dimensional or two-dimensional. However, use of one-dimensional address has the following advantage.

First, an address map of the CPU in the central processor 1 is basically one-dimensional coordinate. Therefore, in case where the two-dimensional address is used in the display controller 2, a necessity arises that an arrangement for converting one-dimensional address into two-dimensional address is provided in the central processor 1 or the display controller 2. In case where one-dimensional address is used, such an arrangement is not necessary, so that a simplification of the arrangement is possible.

Further, when two-dimensional address is used, the above start address must be considered in a two-dimensional manner, so that a necessity arises that two start address setting registers 9 are provided in the control register 5. Further, in case where the address is displayed in a one-dimensional manner, the number of bits may be less than that required for displaying in a two-dimensional manner, so that a simplification of the processing is possible.

Note that, the above arrangement shows examples of the rotation of an image, as the example of an address conversion; however, it is also possible to arrange an address conversion so that an image is reversed left to right. Such an address conversion that the image is reversed left to right is used, for example, in case where an displayed image is reflected by a mirror to be shown to people, or in case where an image that a portrait reflected by a mirror is photographed is displayed.

First, information about left/right reverse is included in the control signal (CTL), and a register for storing the information about left/right reverse is provided. Here, as the information about left/right reverse, binary information that indicates whether or not left/right reverse is performed is enough, so that one bit is enough for the register for storing the information about left/right reverse.

Figure 12:
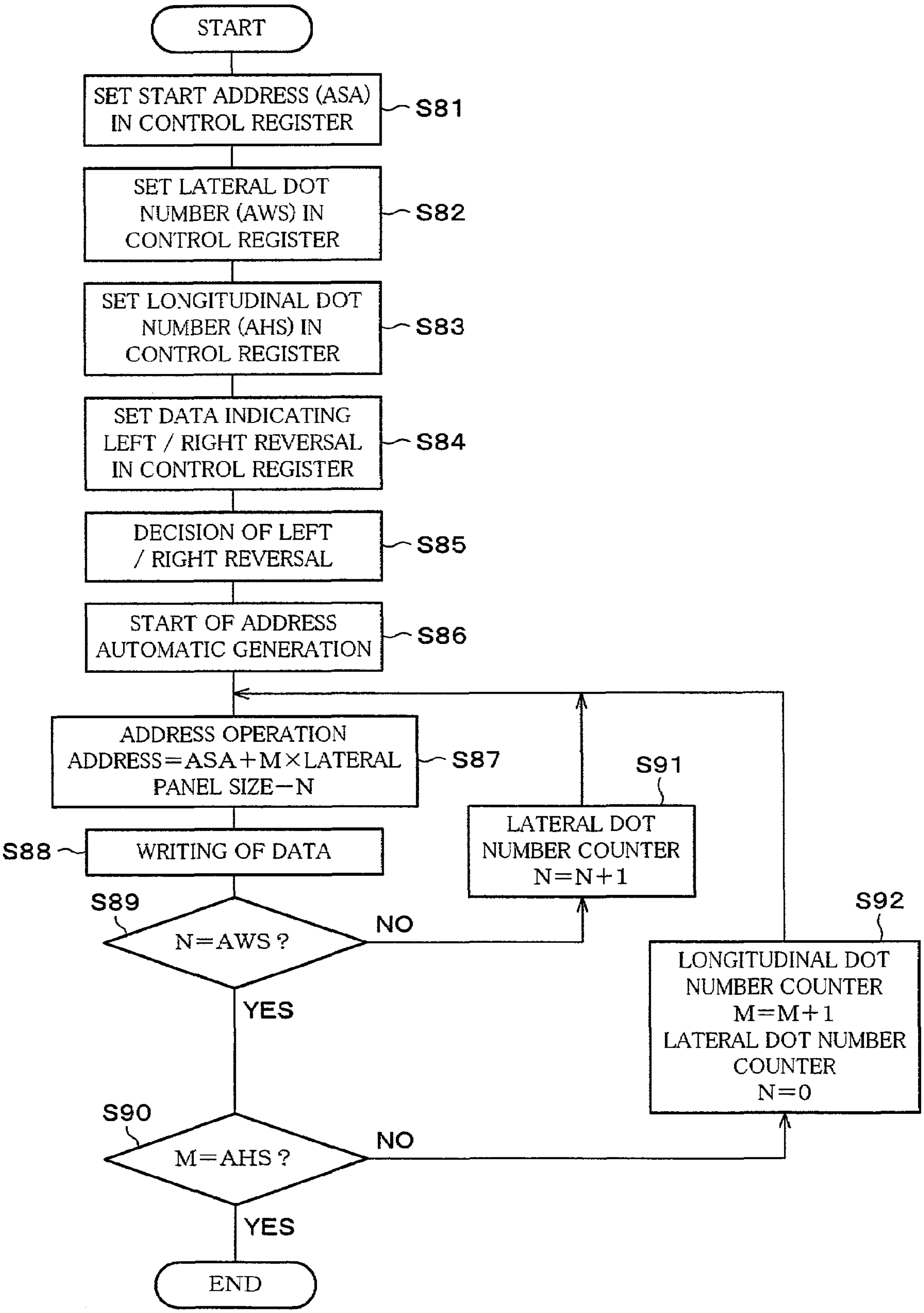
FIG. 12 is a flow chart showing a flow of processes of address conversion in case of the left/right reverse.
Figure 13:
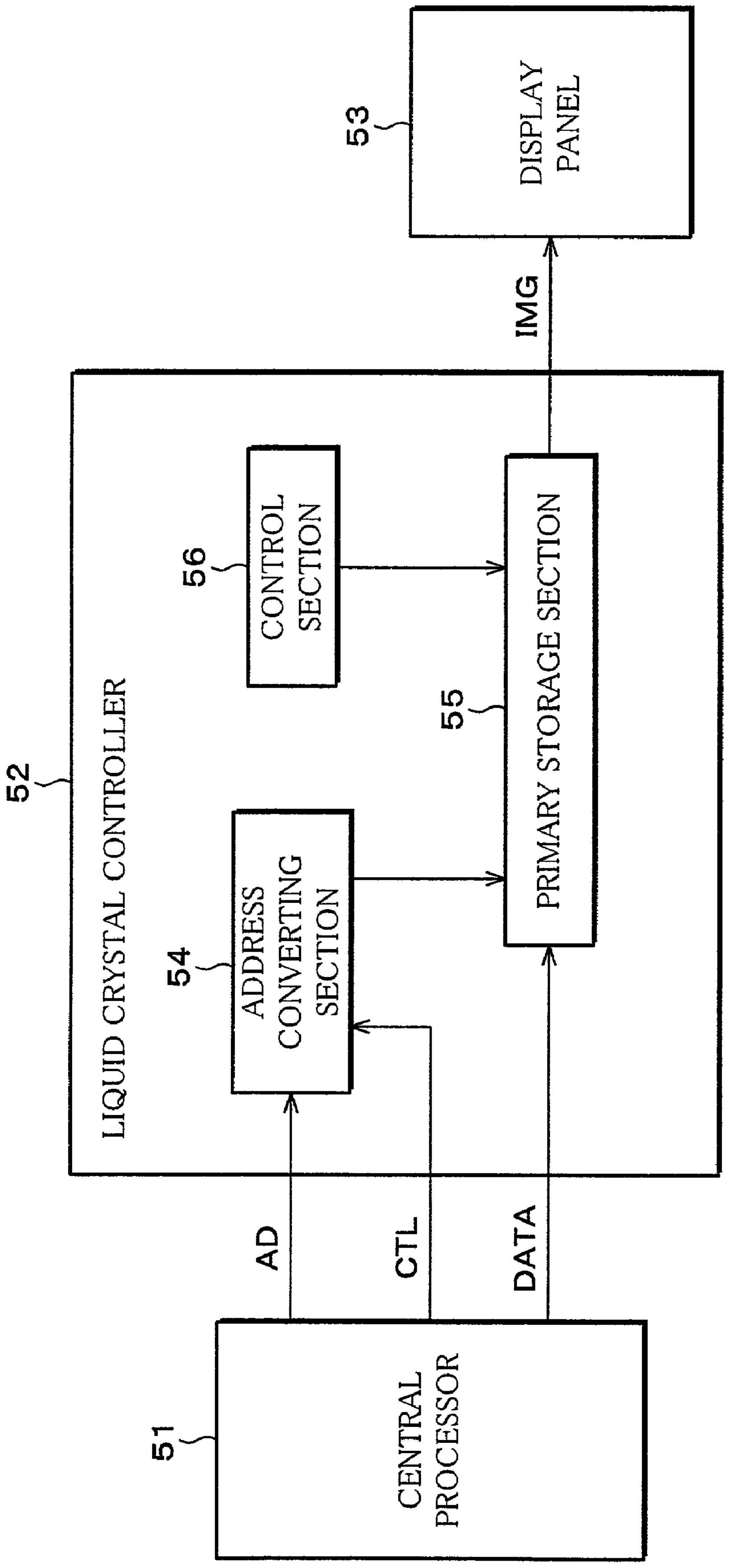
FIG. 13 is a block diagram schematically showing an example of an arrangement of the conventional display system.

A flow of a processing in the left/right reverse is shown in FIG. 12. The process of S81 through S84 is the same as that of S1 through S4 in the flow chart shown in FIG. 6; therefore, the explanation thereof is omitted here.

After referring left/right reverse information set in the register for storing the information about the left/right reverse and checking that left/right reverse will be performed, the display address generating means 6 selects an algorithm for realizing the left/right reverse (S85) and starts an automatic generation of the address, that is, the processing of address conversion (S86).

Here, as in the case of 0° rotation, the address of each pixel with respect to the original image has a lateral address N ($0 \leqq N \leqq AWS$) and a longitudinal address M ($0 \leqq M \leqq AHS$), and an initial value is N=M=0. Then, an address (TAD) after conversion is calculated by the equation: TAD=ASA+M×HPC−N . . . (9) (S87).

When the address (TAD) after conversion is calculated by the above equation (9), data of pixels corresponding to the color data signal (DATA) is written in the appropriate address of the primary storage means 7 (S88). Then, it is determined in S89 whether it is N=AWS. When it is No, 1 is added to a value of N (S91), and the process of S87 is performed again.

On the other hand, when it is determined in S89 that it is N=AWS (YES in S89), it is determined in S90 whether it is M=AHS. When it is determined that it is not M=AHS (NO in S90), 1 is added to a value of M as well as the value of N is reset to zero (S92), and the process of S97 is performed again. On the other hand, when it is determined in S90 that it is M=AHS (YES in S90), it means that all addresses are converted, and the processing of address conversion is finished.

As an example of an arrangement of the display address generating means 6 which performs the address conversion processing of left/right reverse as described above, the arrangement shown in FIG. 10 is given. That is, in case of left/right reverse, it is possible to realize by an arrangement similar to the arrangement for 0° rotation and 180° rotation, and the processing in the display address operating means 17 is changed.

Further, the above equation (9) is an operation for calculating an address of one-dimensional representation. However, the present invention is not limited to this. As in case of the address conversion for rotation, it may be arranged so that an address of two-dimensional representation is calculated in the display address generating means 6, and the resulted address is sent to the primary storage means 7. In such a case, an address conversion computing equation is:

$$TX=SX-N,\ TY=SY+M \quad (10).$$

Note that, the equation (10) is the same as the equation (6), which is a computing equation for 90° rotation. The left/right reverse is performed by counting up a lateral counter, and then, counting up a longitudinal counter.

Next, described is a setting of a lateral display panel dot number (HPC) which is used in the above equations (1) through (4) and (9). Basically, in case where the display panel 3 for use is decided, the lateral display panel dot number (HPC) is not necessary to vary, and it is stored in a decided place, for example, in the display address generating means 6. However, in case where the display panel 3 for use is not decided, the lateral display panel dot number (HPC) varies, depending on types of the display panel 3 for use.

In order to correspond to such a case, it may be arranged so that a lateral pixel number register for storing the lateral display panel dot number (HPC) is provided in the control register 5. In this case, it is designed so that the central processor 1 transmits a signal which represents the lateral display panel dot number (HPC) included in the control signal (CTL) to the display controller 2, and that information of this signal is stored in the lateral pixel number register inside the control register 5. When an address conversion operation is performed in the display address generating means 6, the lateral display panel dot number (HPC) stored in the lateral pixel number register is fetched to carry out the operation.

For such an arrangement, it is possible to set the lateral display panel dot number (HPC) from the central processor 1. Therefore, in case where the display panels 3 of various sizes are used, it is possible to change the setting easily so as to accurately correspond to the panels of various sizes.

As described above, the display controller according to the present invention may further include a control register for temporarily storing the address conversion parameter which is supplied from the external device.

According to the above arrangement, the address conversion parameter supplied from the external device is stored temporarily in the control register, and the display address generating means performs address conversion processing by referring to the address conversion parameter which is stored in the control register. That is, if the address conversion parameter is stored temporarily in the control register, the display address generating means fetch the address conversion parameter from the control register if necessary. Accordingly, the address conversion parameter, transmitted from the external device to the display controller, is transmitted only when its contents must be changed. This makes it possible to minimize the data amount of signals transmitted from the external device to the display controller. Therefore, it is possible to reduce the load of processing and power consumption along with the transfer of signals.

Further, the display controller according to the present invention may further include primary storage means which is composed of a memory having an address space corresponding to the address of the display panel, wherein the image data is stored in an appropriate address of the primary storage means in accordance with the display address which is generated by the display address generating means.

In the above arrangement, the primary storage means is composed of the memory having an address space corresponding to the address of the display panel. Then, the image data is stored in the appropriate address of the primary storage means in accordance with the display address which is generated by the display address generating means. That is, only the information on image data is stored in the primary storage means, and information on display address is indicated by the memory address in which the image data corresponding to each pixel is stored. Accordingly, in the above arrangement, enough is the storage capacity of the extent to which the image data can be stored in the primary storage means. Therefore, the above arrangement makes it possible to need less storage capacity in comparison with, for example, the arrangement that the display address and the image data must be stored as a pair. This makes it possible to realize reduction in the manufacturing cost of the device and decrease in the mounting areas.

In the display controller according to the present invention, the address conversion parameter may include information on an angle for rotating the inputted image data and/or information on whether or not the inputted image data is reversed left to right.

According to the above arrangement, since the address conversion parameter includes the information on the angle for rotating the inputted image data and/or the information on whether or not the inputted image data is reversed left to right, it is possible to specify, for example, such a processing that the image data of the landscape mode is changed to be displayed in the portrait mode. That is, by including the above information in the address conversion parameter, the display controller can perform the processing of address conversion desired by an operator.

In the display controller according to the present invention, the address conversion parameter may include information on a start address when the inputted image data is displayed on the display panel and information on lateral and longitudinal dot widths of the inputted image data.

According to the above arrangement, the information on the start address and the information on the lateral and longitudinal dot widths are included in the address conversion parameter, so that it is possible to display the image with any sizes at any display locations on the display panel. Further, it is also possible to rewrite only a part of the image displayed in the display panel.

The display controller according to the present invention may have an arrangement that the address conversion parameter includes information on the number of dots in the display panel.

In the above arrangement, since the address conversion parameter includes information on the number of dots in the display panel, it is possible to easily change the setting from the external device, for example, even in case where the display panels with a variety of sizes are used. This makes it possible to perform the most suitable address conversion for the number of dots in the display panel used.

The display controller according to the present invention may have an arrangement that the display address, which is generated by the display address generating means, is represented in a one-dimensional manner.

For example, in case where a typical CPU is used for the operating means in the external device, an address map of the CPU is basically one-dimensional coordinate. Therefore, in case where the two-dimensional address is used in the display controller, a necessity arises that an arrangement for converting one-dimensional address into two-dimensional address is provided in the external device or the display controller. In case where display address is in a one-dimensional manner, such an arrangement is not necessary, so that a simplification of the arrangement is possible.

Further, in case where the address is displayed in a one-dimensional manner, the number of bits may be less than that required for displaying in a two-dimensional manner, so that a simplification of the processing is possible.

Further, the image display system according to the present invention may include:

(a) a central processor for performing an editing process of image data;

(b) a display controller outputting the image signal in response to the image data and the address conversion parameter which are supplied from the central processor; and (c) a display panel for displaying an image in accordance with the image signal outputted from the display controller.

In the above arrangement, first, the image data and the address conversion parameter are inputted from the central processor for performing an editing process of image data. That is, the address data signal which represents address information of each pixel with respect to the image data is not sent from the central processor to the display controller. Accordingly, unlike the conventional arrangement, an address bus with a width of plural bits for transmitting an address data signal is not required to be provided between the central processor and the display controller. This makes it possible to provide the image display system which does not cause the problems in providing the address bus with a width of plural bits, that is, the problem of increase in mounting area due to increase in terminals, the problem of increase in power consumption by parasitic capacitance of the address bus, and the problem of EMI.

Further, it is arranged that the address conversion processing is performed by the display address generating means. Therefore, unlike the conventional arrangement, it is not necessary to perform address conversion processing in the central processor, so that it is possible to reduce the load of processing on the central processor. Therefore, even in case where the load on the external device becomes large, for example, by displaying a high-resolution motion picture, it is possible to improve the processing ability in the image display system by causing the display controller to take the load required for the address conversion processing.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display controller which outputs an image signal to a display panel in response to image data and an address conversion parameter indicating how to generate an address of each pixel with respect to the image data which are supplied from an external device, the display controller comprising:

display address generating means for generating a display address of the display panel in accordance with the address conversion parameter, wherein actual address information of any pixel with respect to the image data is not sent from the external device to the display controller but is instead generated within the display controller itself, wherein an address bus from the external device to the display controller is not necessary; and image signal outputting means for outputting the image data as the image signal in accordance with the display address which is generated by the display address generating means.

2. The display controller according to claim 1, further comprising a control register for temporarily storing the address conversion parameter which is supplied from the external device.

3. The display controller according to claim 1, further comprising primary storage means which is composed of a memory having an address space corresponding to the address of the display panel, wherein the image data is stored in an appropriate address of the primary storage means in accordance with the display address which is generated by the display address generating means.

4. The display controller according to claim 1, wherein the address conversion parameter includes information on an angle for rotating the inputted image data and/or information on whether or not the inputted image data is reversed left to right.

5. The display controller according to claim 1, wherein the address conversion parameter includes information on a start address when the inputted image data is displayed on the display panel and information on lateral and longitudinal dot widths of the inputted image data.

6. The display controller according to claim 1, wherein the address conversion parameter includes information on the number of dots in the display panel.

7. The display controller according to claim 1, wherein the display address, which is generated by the display address generating means, is represented in a one-dimensional manner.

8. The display controller according to claim 1, wherein the display panel is a liquid crystal display device.

9. The display controller according to claim 1, wherein the display panel is an organic EL panel.

10. The display controller according to claim 2, wherein the control register includes:

(a) a start address setting register for storing start address information when the inputted image data is displayed on the display panel;

(b) a lateral dot number setting register for storing the number of lateral dots of the inputted image;

(c) a longitudinal dot number setting register for storing the number of longitudinal dots of the inputted image; and (d) a rotating direction setting register for storing rotation information of the inputted image.

11. The display controller according to claim 2, wherein the control register includes a register for storing information on a left/right reverse of the inputted image data.

12. The display controller according to claim 2, wherein the control register includes a lateral pixel number register for storing the number of lateral display panel dots of the display panel.

13. The display controller according to claim 10, wherein the display address generating means includes:

(a) a lateral dot number counter for counting a lateral address of each pixel with respect to an original image for address conversion;

(b) a longitudinal dot number counter for counting a longitudinal address of each pixel with respect to an original image for address conversion;

(c) a comparing circuit for comparing between a value set in the lateral dot number setting register and a value counted by the lateral dot number counter;

(d) a comparing circuit for comparing between a value set in the longitudinal dot number setting register and a value counted by the longitudinal dot number counter; and (e) display address operating means for perform an operation in accordance with the value counted by the lateral dot number counter, the value counted by the longitudinal dot number counter, and the start address information set in the start address setting register.

14. An image display system comprising:

(a) a central processor for performing an editing process of image data;

(b) a display controller including:

display address generating means for generating a display address of a display panel in accordance with an address conversion parameter; and image signal outputting means for outputting the image data as an image signal in accordance with the display address which is generated by the display address generating means, and (c) a display panel for displaying an image in accordance with the image signal outputted from the display controller, the display controller outputting the image signal to the display panel in response to the image data and the address conversion parameter indicating how to generate an address of each pixel with respect to the image data which are supplied from the central processor, wherein actual address information of any pixel with respect to the image data is not sent from the central processor to the display controller but is instead generated within the display controller itself, wherein an address bus from the central processor to the display controller is not necessary.

15. A display control method in a display controller which outputs an image signal to a display panel in response to image data and an address conversion parameter indicating how to generate an address of each pixel with respect to the image data which are supplied from an external device, the display control method comprising the steps of:

(a) generating a display address of the display panel in accordance with the address conversion parameter; and (b) outputting the image data as the image signal in accordance with the display address which is generated by the display address generating means, wherein actual address information of any pixel with respect to the image data is not sent from the external device but is instead generated within the display controller itself, wherein an address bus from the external device to the display controller is not necessary.

16. The display control method according to claim 15, further comprising the step of:

storing temporarily in a control register the address conversion parameter which is supplied from the external device, before the step (a).

17. The display control method according to claim 15, further comprising the step of:

storing the image data in an appropriate address of primary storage means, which is composed of a memory having an address space corresponding to the address of the display panel, in accordance with the display address which is generated by the display address generating means, before the step (b).

18. The display control method according to claim 15, wherein the step (a) includes the steps of:

(c) setting start address information in a start address setting register for storing the start address information when the inputted image data is displayed on the display panel;

(d) setting the number of lateral dots in a lateral dot number setting register for storing the number of lateral dots of the inputted image;

(e) setting the number of longitudinal dots in a longitudinal dot number setting register for storing the number of longitudinal dots of the inputted image; and (f) setting data indicating a rotating direction in a rotating direction setting register for storing rotation information of the inputted image.

19. The display control method according to claim 18, wherein the step (a) includes the steps of:

(g) selecting an algorithm for realizing rotation after checking the rotation information which is set in the rotating direction setting register;

(h) calculating the address after conversion; and (i) comparing between a value of the number of lateral dots set in the lateral dot number setting register and a value counted by a lateral dot number counter, and comparing between a value of the number of longitudinal dots set in the longitudinal dot number setting register and a value counted in a longitudinal dot number counter, after the step (f).

* * * * *